US006463501B1

(12) United States Patent
Kern et al.

(10) Patent No.: US 6,463,501 B1
(45) Date of Patent: Oct. 8, 2002

(54) METHOD, SYSTEM AND PROGRAM FOR MAINTAINING DATA CONSISTENCY AMONG UPDATES ACROSS GROUPS OF STORAGE AREAS USING UPDATE TIMES

(75) Inventors: Ronald Maynard Kern; Gregory Edward McBride; David Michael Shackelford, all of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/422,595

(22) Filed: Oct. 21, 1999

(51) Int. Cl.[7] .............................................. G06F 12/16
(52) U.S. Cl. ..................... 711/100; 711/112; 711/141; 711/162; 711/173; 714/6; 714/20; 707/201; 707/204
(58) Field of Search ................................ 711/112, 114, 711/161, 162, 165, 141, 100, 173; 714/5, 6, 7, 20; 707/201, 204, 202

(56) References Cited

U.S. PATENT DOCUMENTS

| | | | |
|---|---|---|---|
| 5,446,871 A | | 8/1995 | Shomler et al. ................ 714/1 |
| 5,504,861 A | | 4/1996 | Crockett et al. .............. 714/13 |
| 5,546,557 A | | 8/1996 | Allen et al. .................. 714/111 |
| 5,555,371 A | | 9/1996 | Duyanovich et al. ......... 714/13 |
| 5,574,950 A | | 11/1996 | Hathorn et al. ................ 710/8 |
| 5,577,222 A | * | 11/1996 | Micka et al. ................ 711/112 |
| 5,592,618 A | | 1/1997 | Micka et al. ................ 711/162 |
| 5,615,329 A | | 3/1997 | Kern et al. .................... 714/6 |
| 5,680,580 A | | 10/1997 | Beardsley et al. ............. 714/6 |
| 5,720,029 A | * | 2/1998 | Kern et al. ................... 714/20 |
| 5,734,818 A | | 3/1998 | Kern et al. ................... 714/20 |
| 5,737,601 A | | 4/1998 | Jain et al. ................... 707/201 |
| 5,806,075 A | | 9/1998 | Jain et al. ................... 707/201 |
| 5,920,695 A | * | 7/1999 | Hathorn et al. ............. 709/208 |
| 6,052,758 A | * | 4/2000 | Crockett et al. ............ 711/113 |
| 6,078,930 A | * | 6/2000 | Lee et al. .................... 707/202 |
| 6,105,078 A | * | 8/2000 | Crockett et al. ............ 711/162 |
| 6,148,383 A | * | 11/2000 | Micka et al. ................ 711/162 |

OTHER PUBLICATIONS

IBM Technical Disclosure Bulletin, Remote Copy Link–Level Reconfiguration without Affecting Copy Pairs; vol. 38, No. 01, Jan. 1995.
IBM Technical Disclosure Bulletin, Bad Response to Establish Pathing Control Frame in Peer–to–Peer Remote Copy Function, vol., 38, No. 12, Dec. 1995.
IBM Technical Disclosure Bulletin, Efficient Management of Remote Disk Subsystem Data Duplexing, vol. 39, No. 1, Jan. 1996.

* cited by examiner

*Primary Examiner*—Glenn Gossage
(74) *Attorney, Agent, or Firm*—David W. Victor; Konrad Raynes Victor & Mann LLP (57) ABSTRACT

A system, method, and program for maintaining data consistency among updates to data storage areas are provided. Each update has an update time the update was made. There are multiple groups of data storage areas. For each group, updates to the data storage area in the group are stored in a journal for storing updates to the group, wherein there are multiple journals. An indication is made in a memory area for each group of a group update time comprising a most recent update time of the updates in the group. The update time for each update in the group is not greater than the group update time. A determination is made of a minimum group update time across all the groups. At least one update is applied to storage if the update time for the update does not exceed the minimum group update time. The data storage areas may be partitioned among a plurality of computer systems, and may be maintained in at least one primary and secondary storage. The data storage areas may also comprise volumes, with each group including at least one volume. The groups of updates may also be maintained in a journal.

42 Claims, 5 Drawing Sheets

METHOD, SYSTEM AND PROGRAM FOR MAINTAINING DATA CONSISTENCY AMONG UPDATES ACROSS GROUPS OF STORAGE AREAS USING UPDATE TIMES

BACKGROUND OF THE INVENTION

1. Field of the Invention

The present invention relates to a system, method, and program for insuring data consistency across groups of storage areas and, in particular, insuring data consistency in a mass storage device comprised of a plurality of storage systems.

2. Description of the Related Art

Disaster recovery systems typically address two types of failures, a sudden catastrophic failure at a single point in time or data loss over a period of time. In the second type of gradual disaster, updates to volumes may be lost. To assist in recovery of data updates, a copy of data may be provided at a remote location. Such dual or shadow copies are typically made as the application system is writing new data to a primary storage device. International Business Machines Corporation (IBM), the assignee of the subject patent application, provides two systems for maintaining remote copies of data at a secondary site, extended remote copy (XRC) and peer-to-peer remote copy (PPRC). These systems provide a method for recovering data updates between a last, safe backup and a system failure. Such data shadowing systems can also provide an additional remote copy for non-recovery purposes, such as local access at a remote site. These IBM XRC and PPRC systems are described in IBM publication "Remote Copy: Administrator's Guide and Reference," IBM document no. SC35-0169-02 (IBM Copyright 1994, 1996), which publication is incorporated herein by reference in its entirety.

In such backup systems, data is maintained in volume pairs. A volume pair is comprised of a volume in a primary storage device and a corresponding volume in a secondary storage device that includes an identical copy of the data maintained in the primary volume. Typically, the primary volume of the pair will be maintained in a primary direct access storage device (DASD) and the secondary volume of the pair is maintained in a secondary DASD shadowing the data on the primary DASD. A primary storage controller may be provided to control access to the primary DASD and a secondary storage controller may be provided to control access to the secondary DASD. In the IBM XRC environment, the application system writing data to the primary volumes includes a sysplex timer which provides a time-of-day (TOD) value as a time stamp to data writes. The application system time stamps data sets when writing such data sets to volumes in the primary DASD. The integrity of data updates is related to insuring that updates are done at the secondary volume in the volume pair in the same order as they were done on the primary volume. In the XRC and other prior art systems, the time stamp provided by the application program determines the logical sequence of data updates. In many application programs, such as database systems, certain writes cannot occur unless a previous write occurred; otherwise the data integrity would be jeopardized. Such a data write whose integrity is dependent on the occurrence of a previous data write is known as a dependent write. For instance, if a customer opens an account, deposits $400, and then withdraws $300, the withdrawal update to the system is dependent on the occurrence of the other writes, the opening of the account and the deposit. When such dependent transactions are copied from the primary volumes to secondary volumes, the transaction order must be maintained to maintain the integrity of the dependent write operation.

Volumes in the primary and secondary DASDs are consistent when all writes have been transferred in their logical order, i.e., all dependent writes transferred first before the writes dependent thereon. In the banking example, this means that the deposit is written to the secondary volume before the withdrawal. A consistency group is a collection of updates to the primary volumes such that dependent writes are secured in a consistent manner. For instance, in the banking example, this means that the withdrawal transaction is in the same consistency group as the deposit or in a later group; the withdrawal cannot be in an earlier consistency group. Consistency groups maintain data consistency across volumes and storage device. For instance, if a failure occurs, the deposit will be written to the secondary volume before the withdrawal. Thus, when data is recovered from the secondary volumes, the recovered data will be consistent.

A consistency time is a time the system derives from the application system's time stamp to the data set. A consistency group has a consistency time for all data writes in a consistency group having a time stamp equal or earlier than the consistency time stamp. In the IBM XRC environment, the consistency time is the latest time to which the system guarantees that updates to the secondary volumes are consistent. As long as the application program is writing data to the primary volume, the consistency time increases. However, if update activity ceases, then the consistency time does not change as there are no data sets with time stamps to provide a time reference for further consistency groups. If all the records in the consistency group are written to secondary volumes, then the reported consistency time reflects the latest time stamp of all records in the consistency group. Methods for maintaining the sequential consistency of data writes and forming consistency groups to maintain sequential consistency in the transfer of data between a primary DASD and secondary DASD are described in U.S. Pat. Nos. 5,615,329 and 5,504,861, which are assigned to IBM, the assignee of the subject patent application, and which are incorporated herein by reference in their entirety.

Consistency groups are formed within a session. All volume pairs assigned to a session will have their updates maintained in the same consistency group. Thus, the sessions are used to determine the volumes that will be grouped together in a consistency group. Consistency groups are formed within a journal. From the journal, updates from a consistency group are applied to the secondary volume. If the system fails while updates from the journal are being applied to a secondary volume, during recovery operations, the updates that did not complete writing to the secondary volume can be recovered from the journal and applied to the secondary volume.

Because consistency groups are only formed within a session, consistency problems arise if a database or data set spans multiple sessions as consistency groups cannot maintain consistency across sessions. There is thus a need in the art to provide additional methods for allowing consistency across sessions or other groupings of storage areas.

SUMMARY OF THE PREFERRED EMBODIMENTS

Provided is a method, system, and program for maintaining data consistency among updates to data storage areas. Each update has an update time the update was made. There are multiple groups of data storage areas. For each group, an indication is made in a memory area of a group update time comprising a most recent update time of the updates in the group. The update time for each update in the group is not greater than the group update time. A determination is made of a minimum group update time across all the groups. At least one update is applied to storage if the update time for the update does not exceed the minimum group update time.

In further embodiments, updates within a group may further be defined into at least one consistency group having a consistency time. One consistency group within one group is selected. A determination is then made as to whether the consistency time of the selected consistency group is less than the minimum group update time. All the updates in the selected consistency group are applied to storage if the consistency time of the selected consistency group is less than the minimum group update time.

In still further embodiments, updates within a group may further be defined into at least one consistency group having a consistency time. In such case, updates in consistency groups are applied to storage if the update time of the update is less than the minimum group update time. After applying the updates to storage, the data in the storage is consistent as of the minimum group update time.

Yet further, updates in the consistency group are applied to storage during a data recovery operation. In this way, not all of the updates in one consistency group will be applied to the secondary storage if the update time of at least one update in the consistency group is greater than the minimum group update time.

Preferred embodiments of the present invention include a method, system, and program for insuring data consistency across different groups of volumes or storage areas. Preferred embodiments are particularly useful for mass storage spaces comprised of volumes spread across numerous storage systems. With preferred embodiments, the distributed volumes can be defined into groups, e.g., sessions, and updates can be maintained consistent across all groups. In case of a system failure, data recovery can assure that data across all the storage systems is consistent as of a single point-in-time.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
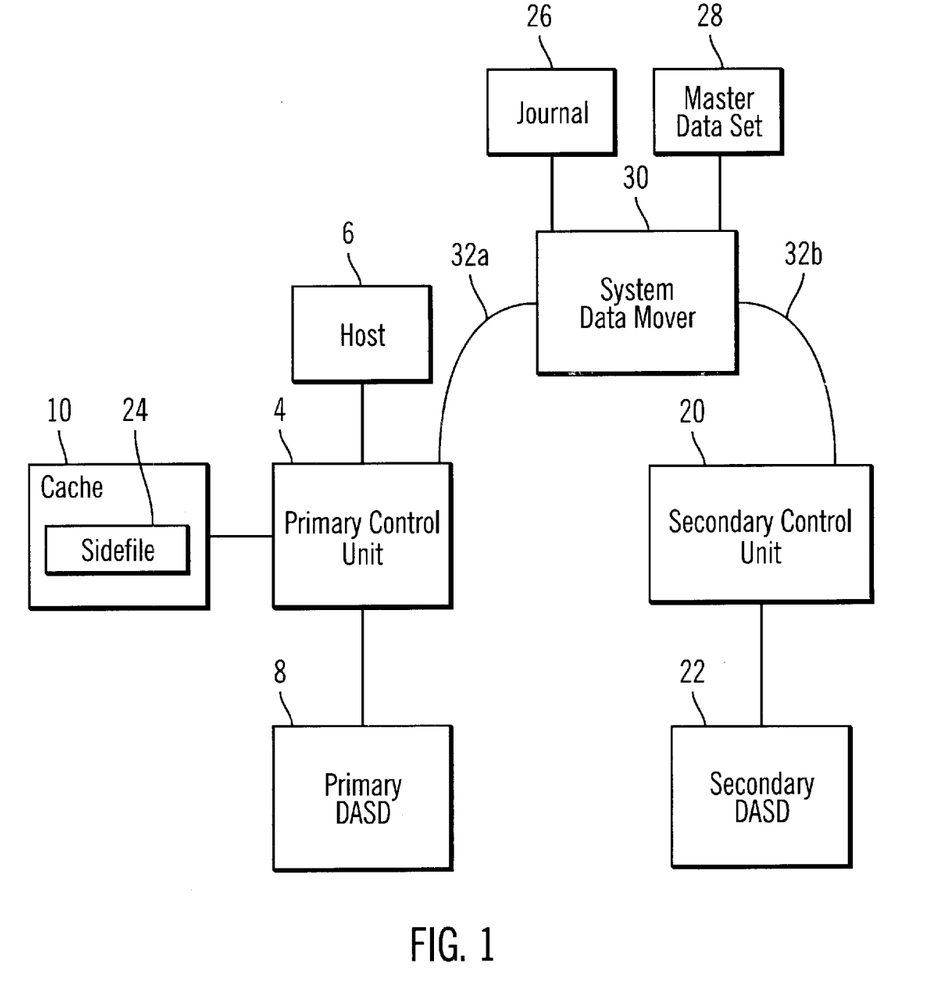
FIG. 1 is a block diagram illustrating a computing environment comprising an arrangement of primary and secondary storage devices in which preferred embodiments are implemented.

FIG. 1 illustrates a computing environment in which preferred embodiments are implemented. A primary control unit 4 provides one or more host 6 computers access to a primary DASD 8. The primary control unit 4 has a primary cache 10 in which updates to tracks in the DASD 8 are maintained until destaged to DASD 8. Back-up copies of all or a subset of the volumes of the DASD 8 may be maintained at a secondary DASD 22. A "volume pair" comprises a volume in the primary DASD 8 and the shadow of that volume in the secondary DASD 22 that maintains a back-up copy of the data at the primary volume in the volume pair. Thus, for each primary volume, there is a corresponding secondary volume with identical contents; this is a volume pair. Updates to the primary DASD 8 are transferred to the secondary control unit 20 for storage in the secondary DASD 8 to assure that the secondary DASD 22 maintains a consistent and concurrent image of the primary DASD 8. The primary control unit 4 may further include a non-volatile storage unit (not shown), such as a battery-backed up volatile memory, to maintain a non-volatile copy of data updates. The control units 4 and 20 may be comprised of the IBM 3990, Model 6 Storage Controller, or any other control unit known in the art.

Preferred embodiments include a system data mover (SDM) program 30, such as the SDM program included in the IBM XRC system, that is in communication with the primary 4 and secondary 20 control units, and manages the transfer of updates to the secondary DASD 22. Thus, data is transferred between the primary 4 and secondary 20 control units via the SDM 30. In preferred embodiments, the SDM 30 and the control units 4 and 20 communicate via communication paths 32a, b, which are preferably direct high speed transmission lines, such as an Enterprise System Connection (ESCON) link. (ESCON is a registered trademark of IBM). However, the communication paths 32a, b may be comprised of any other communication means known in the art, including network transmission lines, etc. The SDM software may be maintained at the site of the primary control unit 4, the secondary control unit 20 or an independent site.

The primary control unit 4 initially writes data updates to a sidefile 24 in a cache 10 for the primary control unit 4. The system data mover (SDM) 30 takes the data updates from the sidefile 24 and writes them to a journal 26. Within the journals, the updates are arranged into consistency groups. Consistency groups are formed for all updates to volumes that share a session. The consistency group contains records that have their order of update preserved, even across multiple storage controls. This preservation of order is absolutely vital for applications that process dependent write Input/Output (I/Os) operations such as index and data and database and log. The master data set 28 includes a list of the sessions being managed and for each managed session, the time of the most recent update to a volume in such session. The journal data sets for a primary/secondary control unit pair may reside on any device. Further details of the arrangement of the system data mover, journal data sets, primary and secondary control units, and DASDs are described in the IBM publication "Planning for IBM Remote Copy," IBM document no. SG24-2595-00 (Copyright IBM Corp., 1995), which publication is incorporated herein by reference in its entirety.

In current implementations, each primary/secondary control unit pair is only capable of managing 256 volumes. Thus, for mass storage spaces that require more than 256 volumes or for sessions including more than 256 volumes, volumes from multiple primary/secondary control unit pairs are included within a single session. Further, data sets may span sessions within a single primary/secondary control unit pair or across multiple primary/secondary control unit pairs.

Figure 2:
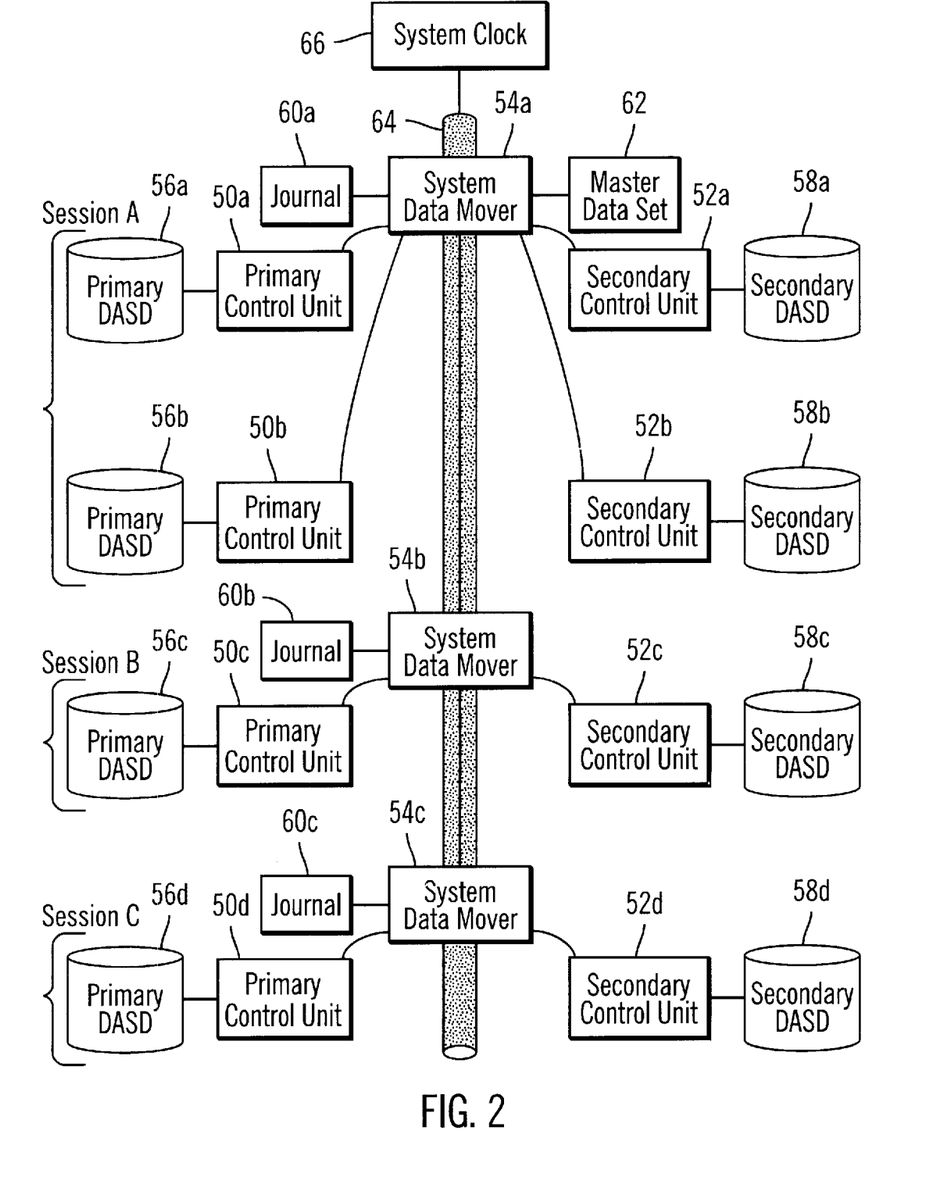
FIG. 2 illustrates a central electronic complex (CEC) comprising multiple instances of the primary and secondary storage devices illustrated in FIG. 1 combined to provide mass storage across multiple systems.

FIG. 2 illustrates an embodiment of a central electronic complex (CEC) comprised of multiple instances of the primary and secondary storage controller system pairs described with respect to FIG. 1 interconnected to form a single mass storage space. Each primary/secondary pair includes a primary control unit 50a, b, c, d; secondary control unit 52a, b, c, d; a system data mover (SDM) 54a, b, c; primary DASD 56a, b, c, d; secondary DASD 58a, b, c, d; journal data sets 60a, b, c; and a master data set (MDS) 62. Each of the primary 50a, b, c, d and secondary 52a, b, c, d control units may each have the architecture described with respect to FIG. 1. Network 64 provides communication among the components and the SDMs 54a, b, and c. In the example of FIG. 2, the volume pairs in the primary and secondary DASDs 56a, 58a and 56b, 58b form the volumes in Session A, the volume pairs in primary and secondary DASDs 56c, 58c form the volumes in Session B, and the volume pairs in primary and secondary DASDs 56d, 58d form the volumes in Session D. However, volumes in the multiple primary/secondary pairs can be arranged in any number of different sessions. A single common system clock 66 provides the time stamps for updates to insure that a common time is used across all primary/secondary pairs in the CEC. Thus, the system clock 66 provides a common time reference for application programs writing updates to volumes in the CEC to insure that updates are not shadowed out of sequence in the CEC.

Once updates are entered in the journal and included within a consistency group, then the updates within a consistency group are applied to the secondary volumes in a manner known in the art. The creation of a consistency group guarantees that the system will shadow data to a remote site in real time with update sequence integrity for any type of data. If the session spans multiple primary/secondary control unit pairs, such as session A in FIG. 2, then the consistency group preserves the order of updates between primary control units 50a and 50b. Details of applying data from consistency groups is described in the commonly assigned patent entitled "Forming Consistency Groups Using Self-describing Record Sets for Remote Data Duplexing" having U.S. Pat. No. 5,734,818, which patent is incorporated herein by reference in its entirety. Using the consistency groups ensures that updates applied to the secondary DASDs within a session are consistent as of the consistency time of the consistency group. If a failure occurs while updates are written from the journal to secondary volumes in the secondary DASD, then during recovery, the updates that were interrupted during system failure can be recovered from the journal and reapplied to the secondary volume. In this way, data is insured consistent within each session during recovery as of a point in time, defined by the consistency group time for a session. However, the use of consistency groups does not insure data is consistent across sessions as the consistency time across sessions may vary. Preferred embodiments provide a solution for insuring that data is consistent across sessions and not just within sessions.

As shown in FIG. 2, the mass storage space formed by the volumes in the DASDs 56a, b, c, d and 58a, b, c, d define three sessions A, B, and C. Data sets may span different sessions and span the volumes between primary/secondary control unit pairs. A master data set (MDS) 62 would include a track for each session A, B, and C (not shown) indicating the time the most recent update to a volume in the session was entered into the journal. There is a system data mover 54a, b, and c for each session A, B, and C, respectively. The system data mover 54a, b, c communicates any changes to the journal 60a, b, c made for the session to the master data set 62 over the network 64. Preferred embodiments provide a way for insuring that updates applied to the secondary DASDs 58a, b, c, d are consistent as of a point-in-time across all sessions. Each primary control unit 50a, b, c, d in FIG. 2 would include the cache 10 and sidefile 24 described with respect to the primary control unit in FIG. 1.

Figure 3:
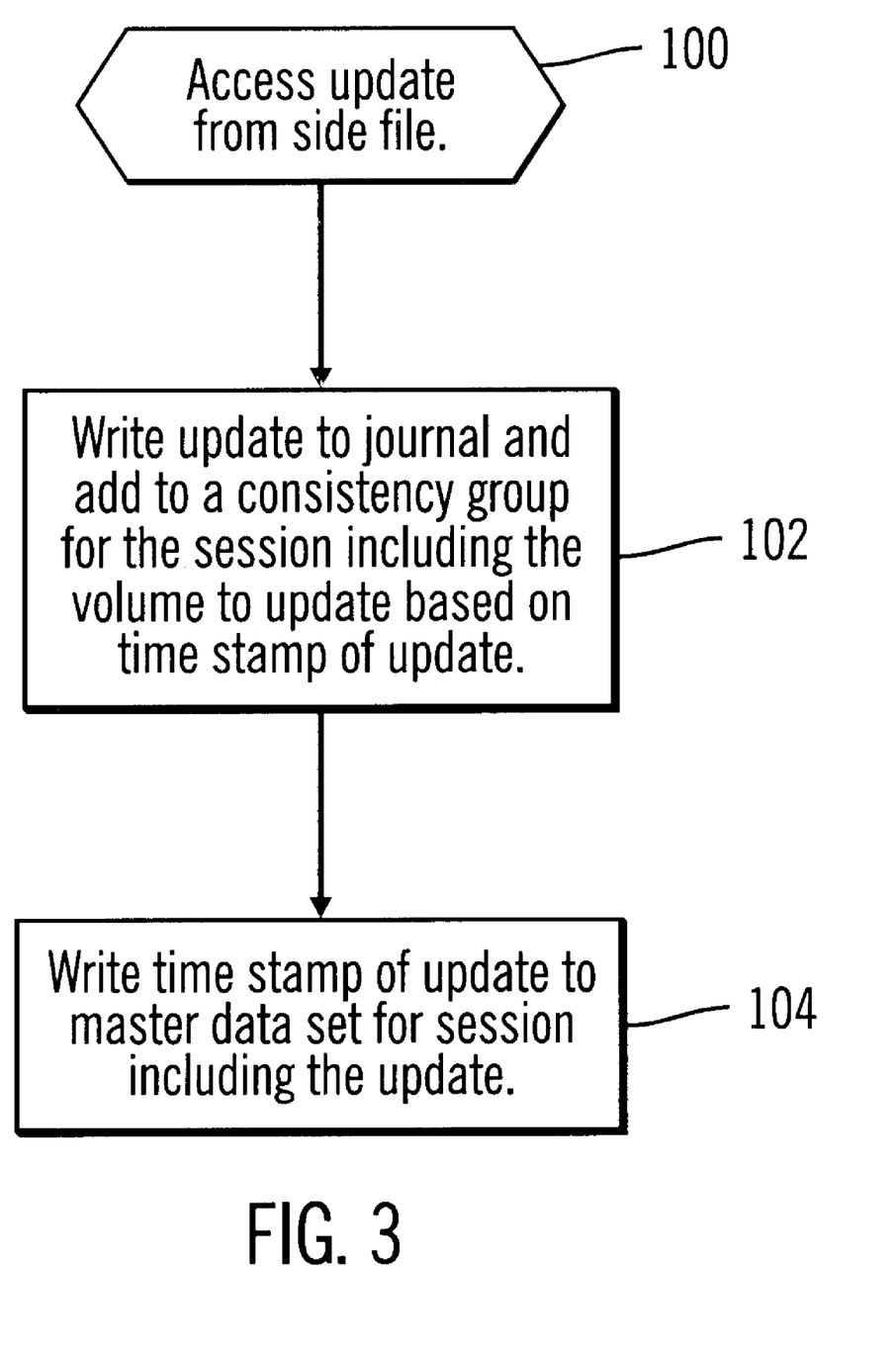
FIG. 3 illustrates logic to process updates in accordance with preferred embodiments of the present invention.

FIG. 3 illustrates logic implemented in the system data movers (SDM) 54a, b, c to journal updates in accordance with the preferred embodiments. Control begins at block 100 with one system data mover 54a, b, or c accessing an update from the sidefile 24. The system data mover 54a, b, or c writes (at block 102) the update to its journal 60a, b, or c and then adds the update to a consistency group within the journal for the session including the volume to update based on the time stamp provided to the update by the system clock 66 in a manner known in the art. The system data mover 54a, b, or c then writes (at block 104) the time stamp of the update to the master data set 62 to indicate the time of the most recent update for the session including the volume to update. For instance, if the update to volume 1 in session A was time stamped T1, then the system data mover 54a, b or c would communicate to the master data set 62 that the most recent update to the journal 60a for session A was at T1. With the logic of FIG. 3, the session tracks in the master data set 60 indicate the time of the most recent update time for each session maintained in the CEC, across all primary/secondary control unit pairs.

In alternative embodiments, instead of using the master data set 62 to indicate the most recent updates for each session, when updates occur, the primary control unit performing the update to the journal 60a, b, c may send a message to the other primary control units of the update. In this way, each primary control unit would separately maintain information on the most recent update time for each session. Still further, a shared cache coupling facility could be used to hold the most recent update times for each session.

Figure 4:
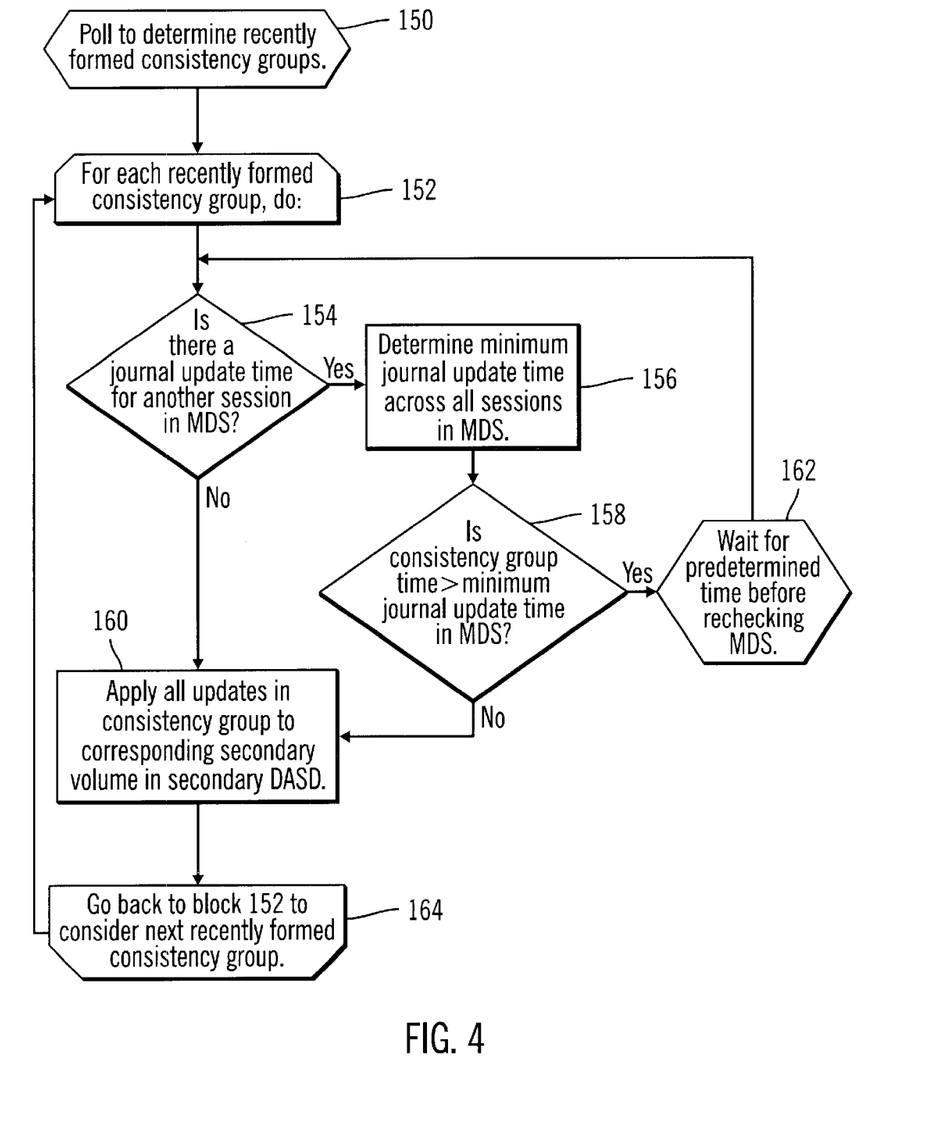
FIG. 4 illustrates logic to apply consistency groups to secondary storage in accordance with preferred embodiments of the present invention.

FIG. 4 illustrates logic implemented in the system data mover 54a, b, and c to apply consistency groups in the journal 60a, b, c to the secondary DASD 58a, b, c, d within a session during normal update operations. Control begins at block 150 with the system data mover 54a, b, or c polling, at predetermined intervals, the journal 60a, b, c for new consistency groups formed since the last polling operation. At block 152, the system data mover 54a, b or c begins a loop for each recently formed consistency group in the journal 60a, b or c. The system data mover 54a, b or c first determines (at block 154) whether the master data set 62 includes journal update time for one other session. If so, then the system data mover 54a, b, or c determines (at block 156) the minimum most recent journal update time across all the sessions indicated in the MDS 62. As discussed, the MDS 62 maintains the most recent journal update time for each session, across all sessions and volumes coupled to the MDS 62, which may include sessions spanning multiple DASDs as shown in FIG. 2. If the consistency time is greater than the minimum most recent journal update time across all sessions, then the program enters a wait state (at block 162)

for a predetermined time. After waiting the predetermined time, the system data mover 54a, b or c scans or rechecks the MDS 62 to determine if the consistency time for the group is now less than the minimum most recent journal update time. This operation at block 162 may occur asynchronously to the polling (at block 150) of the journal 60a, b or c for consistency groups to apply. After waiting the predetermined time, the system data mover 54a, b or c then returns to block 154 to determine whether the consistency time of the consistency group being considered is now less than the minimum journal update time.

If there is no most recent update time for another session in the MDS 62 (at block 154) or the consistency group time is less than or equal to the minimum most recent update time across all other sessions (at block 158), then the system data mover 54a, b or c applies all updates in the consistency group to the corresponding secondary volume in the secondary DASD 58a, b or c. After applying the consistency group, control proceeds (at block 164) back to block 152 to process the next recently formed consistency group in the journal 60a, b, and c. With the preferred logic of FIG. 4, only those consistency groups whose consistency time is less than the minimum journal update time across all sessions is applied. This ensures that no consistency group for a session will be applied that has a consistency time that exceeds the most recent update to the journal 60a, b, c for any other session. This ensures that data is not applied to the secondary storage unless all other updates in the journal are current as of the consistency time. This further ensures that in the event of a failure, all data across all sessions in either the journals 60a, b, c or the secondary DASD 58a, b, c, d is consistent as of the minimum journal update time across all sessions. Thus, data applied to the secondary DASD 58a, b, c, d will not include any updates that exceed the minimum journal update time across sessions.

Figure 5:
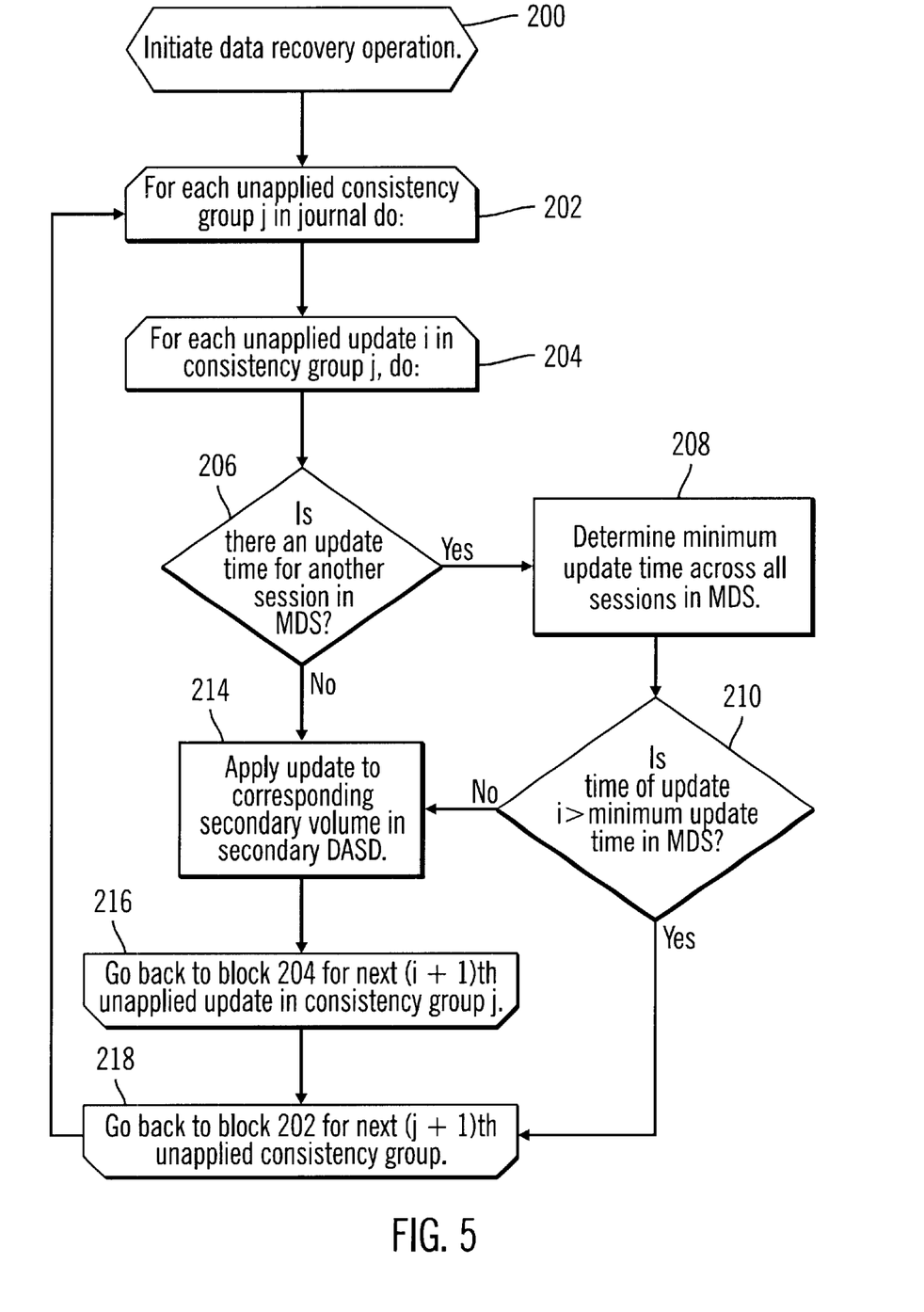
FIG. 5 illustrates logic to apply updates from unapplied consistency groups in a journal to secondary storage during data recovery operations in accordance with preferred embodiments of the present invention.

FIG. 5 illustrates logic implemented in the system data movers 54a, b or c to recover data in the event of a system failure in a manner that ensures that all updates across all sessions are consistent as of a point in time. Control begins at block 200 with the initiation of a data recovery operation. A loop begins at block 202 for each unapplied consistency group j in the journals 60a, b, c. An inner loop begins at block 204 for each unapplied update i in an unapplied consistency group j. Within the loops, the system data mover 54a, b or c first determines (at block 206) whether the master data set 62 includes an update time for one other session. If so, then the system data mover 54a, b, or c determines (at block 208) the minimum most recent journal update time across all other sessions indicated in the MDS 62. If the time of the update i in consistency group j is greater than the minimum most recent journal update time for all the sessions indicated in the MDS 62 (at block 210), then the system data mover 54a, b, or c will not apply the update i or any following updates in consistency group j to secondary storage and will proceed (at block 218) to consider the next (j+l)th consistency group in the journal 60a, b or c. Otherwise, if the time of the update i to the journal 60a, b or c is less than or equal to the minimum journal update time across all sessions (at block 210) or there is not an update time for another session in the MDS 62 (at block 206), then the system data mover 54a, b or c applies (at block 214) the update i in consistency group j from the journal 60a, b or c to the corresponding secondary DASD 58a, b, c or d via the secondary control unit 52a, b, c, or d.

The logic of FIG. 5 considers the minimum of the most recent updates to each session. This ensures that when updates within one consistency group are applied to the secondary volume, that the journal maintains all updates across all sessions that occur prior to the time of the update being applied. In this way, if a failure occurs, updates can be recovered from the journal such that the recovered updates across all sessions are consistent as of a single point-in-time. In preferred embodiments, the most recent update times for other sessions are only considered for those sessions that have had updates written to the journal. If a session has not had an update written to the journal, then that session will not be considered when making sure updates are consistent across sessions. Consider the following example. Updates at times 4 and 5 (T4 and T5) are added to the journal for session A. As a result, the most recent update time indicated in the master data set for session A is T5. If the most recent update time indicated in the MDS for session B is T3 and for session C is T2, then, with the preferred logic of FIGS. 4 and 5, the updates at time 4 and 5 to session A will not be applied to the secondary volume as they exceed the most recent updates for the other sessions B and C. If, contrary to the logic of FIG. 4 and 5, the updates at T4 and T5 were applied and there were updates for sessions B and C prior to T5 not yet applied to the journal, then the data cannot be guaranteed to be consistent across all sessions if the system fails after the updates at T4 and T5 for session A are applied. The reason being is that any updates for sessions B and C following the most recent update time indicated in the master data set for sessions B and C and prior to T5 that were not applied to the journal cannot be recovered and applied to the secondary volume. Thus, session A would be guaranteed consistent as of time T5 and the other sessions B and C would only be consistent as of the most recent update times indicated in the master data set of T2 and T3, respectively. Updates for sessions B and C not added to the journal following T2 and T3, respectively, would be lost. Thus, without the preferred logic of FIGS. 4 and 5, during recovery, all the sessions are not consistent as of the same point in time. This result can be especially problematic if data sets span sessions. In such case, the data within the same data set may not be consistent as of a single time.

With the logic of FIG. 5, during recovery, the updates to session A at T4 and T5 would not be applied to the secondary volume as the minimum recent update time for the other sessions is T2. With the logic of FIG. 5, the updates at T4 and T5 for session A can only be applied to the secondary volumes when sessions B and C add updates to the journal following the update added at T5. By not applying updates added to the journal following the minimum recent update time across all sessions, data is consistent as of the minimum most recent update time across all sessions. This insures that during recovery, data in volumes within all the sessions remains consistent as of the same point-in-time, which is the minimum recent update time indicated in the master data set. With the logic of FIG. 5, it is possible that only a portion of the updates in a consistency group are applied to the secondary volume if the consistency group includes updates before and after the minimum recent update time across all sessions.

In preferred embodiments, if the system data mover (SDM) 54a, b, or c does not detect any updates added to the side file, then the system data mover may advance the most recent update time in the MDS 62 for the session if no updates were received prior to the advanced-to-time. This advances the most recent update time and, hence, the minimum of the most recent update times across sessions in the MDS 62 to allow updates for other sessions to apply if the session has not received any updates.

The preferred logic of FIGS. 4 and 5 is especially useful for insuring data integrity across sessions if data in one session is dependent on data in another session. Dependency of data across sessions can occur when data sets span sessions. With the preferred logic, dependent data that is dependent on earlier data would not be applied to the secondary volume until the earlier data on which the data depends is at least written to the journal. For instance, if a customer deposits $300 at time one (T1) and writes a check at time three (T3) intending to use the funds of the deposit, the cashing of the check is dependent on the deposit. If the deposit and withdrawal for the check are in different sessions, then the preferred logic ensures that the withdrawal at T3 will not be applied to the secondary volume at least until the deposit at T1 is added to the journal. Thus, preferred embodiments ensure consistency across sessions.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments were described with respect to the IBM XRC computing environment. However, the preferred logic for maintaining consistency could be applied to maintain consistency in other environments. Thus, in alternative embodiments, the data for which consistency is maintained may include data other than data to be moved between different sites or storage areas for back-up purposes. Further, preferred embodiments may apply to environments other than the IBM XRC environment, such as a peer-to-peer back-up system, e.g., IBM PPRC.

Preferred embodiments were described as implemented in a mainframe operating system, such as the IBM S/390 system, and the IBM 3990 Storage Controller where specific commands, such as control unit end, device end, etc., are involved when the storage controller attempts to reconnect to the I/O operation. However, those skilled in the art will appreciate that the data structures and logic of FIGS. 3 and 4 to maintain data consistency could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

In preferred embodiments data in the storage devices was arranged in volumes and the volumes were grouped into sessions. In alternative systems, the storage areas on which data is maintained may be grouped according to storage units other than volumes that are grouped in groupings other than sessions for the purpose of maintaining consistency.

Preferred embodiments were described with respect to a host system that communicates with a channel subsystem, which in turn communicates via channel paths to control units, which access the I/O devices. In alternative embodiments, the data paths may extend from the channel subsystem directly to the I/O device or, alternatively, from the host system directly to the I/O device without the intervention of the channel subsystem and subchannel constructs.

The preferred logic of FIGS. 3, 4, and 5 was described as being implemented in software within the system data mover 54a, b, c component. This logic may be part of the operating system of the host systems or an application program such as the IBM DFSMS storage management software. In yet further embodiments, this logic may be maintained in storage areas managed by the control units or in a read only memory or other hardwired type of device. The preferred logic may be implemented in hard disk drives or in programmable and non-programmable gate array logic.

In summary, provided is a system, method, and program for maintaining data consistency among updates to data storage areas. Each update has an update time the update was made. There are multiple groups of data storage areas. For each group, an indication is made in a memory area for each group of a group update time comprising a most recent update time of the updates in the group. The update time for each update in the group is not greater than the group update time. A determination is made of a minimum group update time across all the groups. At least one update is applied to storage if the update time for the update does not exceed the minimum group update time.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for maintaining data consistency among updates to data storage areas, wherein each update has an update time the update was made, comprising:

defining multiple groups of data storage areas;

for each group, storing updates to the data storage area in the group in a journal for storing updates to the group, wherein there are multiple journals;

for each group, indicating in a memory area a group update time of a most recent update time of the updates in the journal for the group, wherein the update time for each update in the group is not greater than the group update time;

determining a minimum group update time across all the groups; and applying at least one update to storage from each journal if the update time for the update does not exceed the minimum group update time.

2. The method of claim 1, wherein the data storage areas are partitioned among a plurality of computer systems and wherein the groups are capable of defining updates to data storage areas across computer systems.

3. The method of claim 1, wherein the data storage areas are maintained in at least one primary and secondary storage device and wherein applying the update comprises writing the update to the data storage area in the secondary storage device.

4. The method of claim 1, further comprising:
receiving one update to one data storage area in one group; and
setting the most recent update time for the group including the received update to the update time for the received update.

5. The method of claim 1, further comprising:
storing received updates in a storage device, wherein applying the updates comprises writing the updates from the storage device to a storage system; and
during data recovery, applying updates in the storage device to the storage system.

6. The method of claim 1, further comprising:
determining for one group a point-in-time as of which no updates have been received for the storage areas within the group; and
setting the most recent update time for the one group to the determined point-in-time.

7. The method of claim 1, wherein the data storage areas comprise volumes, and wherein each group includes at least one volume.

8. The method of claim 1, wherein one data mover program is associated with each group, wherein, for each group, the data mover program stores the updates in the journal for the group and indicates in the memory area the group update time.

9. The method of claim 1, wherein the updates to the journal in each group are arranged in at least one consistency group such that the consistency group includes dependent updates and the updates from which the dependent updates depend as of a consistency time, and wherein consistency groups are formed in each journal independently of the consistency groups in the other journals.

10. The method of claim 9, further comprising applying all the updates in groups to storage if the update time of the update is less than the minimum group update time, wherein after applying the updates to storage, the data in the storage is consistent as of the minimum group update time.

11. The method of claim 1, wherein updates in the journal for each group are defined into at least one consistency group having a consistency time, further comprising:
selecting one consistency group within the journal for each selected group;
determining whether the consistency time of the selected consistency group is less than the minimum group update time; and
applying all the updates in the selected consistency group to storage if the consistency time of the selected consistency group is less than the minimum group update time.

12. The method of claim 11, further comprising reconsidering whether the consistency time of the selected consistency group is less than a current minimum group update time after a predetermined period of time if the consistency time is greater than the minimum group update time.

13. The method of claim 1, wherein updates in the journal for each group are defined into at least one consistency group having a consistency time, wherein consistency groups are formed in each journal independently of the consistency groups in the other journals, further comprising applying updates in consistency groups to storage if the update time of the update is less than the minimum group update time, wherein after applying the updates to storage, the data in the storage is consistent as of the minimum group update time.

14. The method of claim 13, wherein the updates in the consistency group are applied to storage during a data recovery operation, whereby not all of the updates in one consistency group will be applied to the secondary storage if the update time of at least one update in the consistency group is greater than the minimum group update time.

15. A system for maintaining data consistency, comprising:
data storage areas;
updates to the data storage areas, wherein each update has an update time the update was made;
a plurality of journals, wherein there is one journal for each group;
means for storing updates for each group to the data storage area in the group in the journal for storing updates to the group, wherein there are multiple journals;
means for defining multiple groups of data storage areas;
means for indicating in a memory area a group update time of a most recent update time of the updates in the journal for one group, wherein the update time for each update in the group is not greater than the group update time;
means for determining a minimum group update time across all the groups; and
means for applying at least one update to storage from each journal if the update time for the update does not exceed the minimum group update time.

16. The system of claim 15, wherein the data storage areas are partitioned among a plurality of computer systems and wherein the groups are capable of defining data storage areas across computer systems.

17. The system of claim 15, wherein the data storage areas are maintained in at least one primary and secondary storage device and wherein the means for applying the update comprises writing the update to the data storage area in the secondary storage device.

18. The system of claim 15, further comprising:
means for receiving one update to one data storage area in one group; and
means for setting the most recent update time for the group including the received update to the update time for the received update.

19. The system of claim 15, further comprising:
means for storing received updates in a storage device, wherein the means for applying the updates comprises writing the updates from the storage device to a storage system; and
means for applying updates in the storage device co the storage system during data recovery.

20. The system of claim 15, further comprising:
means for determining for one group a point-in-time as of which no updates have been received for the storage areas within the group; and
means for setting the most recent update time for the one group to the determined point-in-time.

21. The system of claim 15, wherein the data storage areas comprise volumes, and wherein each group includes at least one volume.

22. The system of claim 15, further comprising:
a plurality of data mover programs, wherein one data mover is associated with each group, and wherein the data mover for each group stores the updates in the journal for the group and indicates in the memory area the group update time.

23. The system of claim 15, wherein the updates to the journal in each group are arranged in at least one consistency group such that the consistency group includes dependent updates and the updates from which the dependent updates depend as of a consistency time, and wherein consistency groups are formed in each journal independently of the consistency groups in the other journals.

24. The system of claim 23, wherein the means for applying at least one update further performs applying all the updates in groups to storage if the update time of the update is less than the minimum group update time, wherein after applying the updates to storage, the data in the storage is consistent as of the minimum group update time.

25. The system of claim 15, wherein updates in the journal for each group are defined into at least one consistency group having a consistency time, further comprising:
   means for selecting one consistency group within the journal for each selected group;
   means for determining whether the consistency time of the selected consistency group is less than the minimum group update time, wherein the means for applying at least one update further performs applying all the updates in the selected consistency group to storage if the consistency time of the selected consistency group is less than the minimum group update time.

26. The system of claim 25, further comprising means for reconsidering whether the consistency time of the selected consistency group is less than a current minimum group update time after a predetermined period of time if the consistency time is greater than the minimum group update time.

27. The system of claim 15, wherein updates in the journal for each group are defined into at least one consistency group having a consistency time, wherein consistency groups are formed in each journal independently of the consistency groups in the other journals, wherein the means for applying at least one update further performs applying updates in consistency groups to storage if the update time of the update is less than the minimum group update time, wherein after applying the updates to storage, the data in the storage is consistent as of the minimum group update time.

28. The system of claim 27, wherein the updates in the consistency group are applied to storage during a data recovery operation, whereby not all of the updates in one consistency group will be applied to the secondary storage if the update time of at least one update in the consistency group is greater than the minimum group update time.

29. An article of manufacture for use in maintaining data consistency among updates to data storage areas, wherein each update has an update time the update was made, the article of manufacture comprising computer readable storage media including at least one computer program embedded therein capable of causing a processor to perform:
   defining multiple groups of data storage areas;
   for each group, storing updates to the data storage area in the group in a journal for storing updates to the group, wherein there are multiple journals;
   for each group, indicating in a memory area a group update time of a most recent update time of the updates in the journal for the group, wherein the update time for each update in the group is not greater than the group update time;
   determining a minimum group update time across all the groups; and
   applying at least one update to storage from each journal if the update time for the update does not exceed the minimum group update time.

30. The article of manufacture of claim 29, wherein the data storage areas are partitioned among a plurality of computer systems and wherein the groups are capable of defining updates to data storage areas across computer systems.

31. The article of manufacture of claim 29, wherein the data storage areas are maintained in at least one primary and secondary storage device and wherein applying the update comprises writing the update to the data storage area in the secondary storage device.

32. The article of manufacture of claim 29, further comprising:
   receiving one update to one data storage area in one group; and
   setting the most recent update time for the group including the received update to the update time for the received update.

33. The article of manufacture of claim 29, further comprising:
   storing received updates in a storage device, wherein applying the updates comprises writing the updates from the storage device to a storage system; and
   during data recovery, applying updates in the storage device to the storage system.

34. The article of manufacture of claim 29, further comprising:
   determining for one group a point-in-time as of which no updates have been received for the storage areas within the group; and
   setting the most recent update time for the one group to the determined point-in-time.

35. The article of manufacture of claim 29, wherein the data storage areas comprise volumes, and wherein each group includes at least one volume.

36. The article of manufacture of claim 29, wherein the at least one computer program comprises one data mover program associated with each group, wherein, for each group, the data mover program stores the updates in the journal for the group and indicates in the memory area the group update time.

37. The article of manufacture of claim 29, wherein the updates to the journal in each group are arranged in at least one consistency group such that the consistency group includes dependent updates and the updates from which the dependent updates depend as of a consistency time, and wherein consistency groups are formed in each journal independently of the consistency groups in the other journals.

38. The article of manufacture of claim 37, further comprising applying all the updates in groups to storage if the update time of the update is less than the minimum group update time, wherein after applying the updates to storage, the data in the storage is consistent as of the minimum group update time.

39. The article of manufacture of claim 29, wherein updates in the journal for each group are defined into at least one consistency group having a consistency time, further comprising:
   selecting one consistency group within the journal for each selected group;
   determining whether the consistency time of the selected consistency group is less than the minimum group update time; and
   applying all the updates in the selected consistency group to storage if the consistency time of the selected consistency group is less than the minimum group update time.

40. The article of manufacture of claim 39, further comprising reconsidering whether the consistency time of the selected consistency group is less than a current minimum group update time after a predetermined period of time if the consistency time is greater than the minimum group update time.

41. The article of manufacture of claim 29, wherein updates in the journal for each group are defined into at least one consistency group having a consistency time, wherein consistency groups are formed in each journal independently of the consistency groups in the other journals, further comprising applying updates in consistency groups to storage if the update time of the update is less than the minimum group update time, wherein after applying the updates to storage, the data in the storage is consistent as of the minimum group update time.

42. The article of manufacture of claim 41, wherein the updates in the consistency group are applied to storage during a data recovery operation, whereby not all of the updates in one consistency group will be applied to the secondary storage if the update time of at least one update in the consistency group is greater than the minimum group update time.

* * * * *

UNITED STATES PATENT AND TRADEMARK OFFICE
CERTIFICATE OF CORRECTION

PATENT NO. : 6,463,501 B1
DATED : October 8, 2002
INVENTOR(S) : Ronald Maynard Kern, Gregory Edward McBride and David Michael Shackelford It is certified that error appears in the above-identified patent and that said Letters Patent is hereby corrected as shown below:

Column 12,
Line 51, delete "co" and insert -- to --.

Signed and Sealed this

Tenth Day of January, 2006

JON W. DUDAS
*Director of the United States Patent and Trademark Office*